(12) United States Patent
Wahl et al.

(10) Patent No.: US 7,148,437 B2
(45) Date of Patent: Dec. 12, 2006

(54) COVERINGS FOR A STEERING WHEEL

(75) Inventors: Georg Wahl, Pforzheim (DE); Bojan Rosman, Stuttgart (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/123,160

(22) Filed: May 6, 2005

(65) Prior Publication Data
US 2005/0247549 A1 Nov. 10, 2005

(30) Foreign Application Priority Data
May 7, 2004 (DE) .................. 10 2004 022 634

(51) Int. Cl.
*H01H 9/00* (2006.01)
(52) U.S. Cl. .................................. 200/61.54
(58) Field of Classification Search .. 200/61.54–61.57; 74/552; 280/728.2, 731, 777, 728.3
See application file for complete search history.

(56) References Cited

U.S. PATENT DOCUMENTS

| | | | |
|---|---|---|---|
| 5,335,743 A * | 8/1994 | Gillbrand et al. ........... 180/178 |
| D366,021 S * | 1/1996 | Tharp ......................... D12/176 |
| 6,453,769 B1 * | 9/2002 | Sakurai ........................ 74/552 |
| 6,548,772 B1 * | 4/2003 | Liburdi ..................... 200/61.54 |
| 6,592,142 B1 * | 7/2003 | Landen et al. ........... 280/728.2 |
| 6,624,365 B1 * | 9/2003 | Miyako et al. .......... 200/61.54 |
| 6,626,458 B1 * | 9/2003 | Fujita et al. ............. 280/728.3 |
| 6,768,067 B1 * | 7/2004 | Adachi et al. ........... 200/61.54 |
| D503,665 S * | 4/2005 | Pfeiffer et al. ............. D12/176 |
| 6,874,386 B1 * | 4/2005 | Xu et al. ....................... 74/552 |
| 6,941,836 B1 * | 9/2005 | Umemura et al. ............ 74/552 |
| 2002/0027343 A1 | 3/2002 | Landen et al. |
| 2002/0046936 A1 | 4/2002 | Ibe et al. |
| 2003/0101840 A1 | 6/2003 | Yoshikawa et al. |
| 2004/0083849 A1 | 5/2004 | Umemura et al. |
| 2004/0084291 A1 | 5/2004 | Adachi et al. |

FOREIGN PATENT DOCUMENTS

| | | |
|---|---|---|
| DE | 101 01 010 A1 | 7/2002 |
| EP | 1 190 918 A2 | 3/2002 |

* cited by examiner

*Primary Examiner*—Michael A. Friedhofer
(74) *Attorney, Agent, or Firm*—Crowell & Moring LLP

(57) ABSTRACT

Coverings suitable for a steering wheel of a motor vehicle are inserted into at least two approximately horizontally oriented spokes connected with a steering wheel ring adjacent to the steering wheel ring. The coverings are constructed for the accommodation of switches. On one side, each covering leads away from the steering wheel ring and, on the other side, each covering adjoins a trim plate of the steering wheel. In order to provided the steering wheel with an advantageous design, the coverings are constructed as modules which, depending on the equipment of the motor vehicle, have function areas provided with areas without switches and/or with switches.

7 Claims, 5 Drawing Sheets

COVERINGS FOR A STEERING WHEEL

This application claims the priority of German application 10 2004 022 634.2, filed May 7, 2004, the disclosure of which is expressly incorporated by reference herein.

BACKGROUND AND SUMMARY OF THE INVENTION

This invention relates to coverings for a steering wheel of a motor vehicle having at least two approximately horizontally oriented spokes which are connected with a steering wheel ring and into which the coverings are inserted adjacent to the steering wheel ring, the coverings, on first sides, being bounded by expansions of the steering wheel ring and, on second sides, being bounded by a center part of the steering wheel.

Published U.S. patent application US 2003/0101840 A1 discloses a steering wheel which is installed in a motor vehicle and which has a steering wheel ring, two horizontal spokes, and one upright spoke, with the upright spoke extending below a horizontal steering wheel plane. Switches for backshifting transmission gears of a multifunction transmission with an automatic mode and a manual mode are inserted into the horizontal spokes.

A similar motor vehicle steering wheel is discussed in European Patent Document EP 1 190 918 A2. In this steering wheel, coverings facing a driver for receiving switches for operation of devices of the motor vehicle are provided in the horizontal spokes adjacent to a steering wheel ring.

It is an object of the invention to further develop coverings for the installation in spokes of a steering vehicle of a motor vehicle in such a manner that steering wheels with the same basic construction can be used for various vehicle models having different devices.

According to the invention, this object is achieved by having the coverings constructed as modules and, depending on the equipment of the motor vehicle, comprising function areas provided with areas without switches, with switches, or both without switches and with switches. Additional characteristics of the invention are also claimed.

Principal advantages achieved by the invention are that the coverings, constructed as modules depending on the equipment of the motor vehicle, comprise function areas provided with areas having no switches and/or with switches. By way of this construction, different coverings for defined equipment types or devices of the motor vehicle can be built in connection with steering wheels of the same basic construction. Multiple combinations of areas without switches and function areas comprising switches can be implemented on the coverings. The coverings offer a number of solutions for accommodating switches which are easy to operate and largely flush with the surface. Specifically, a transmission switch for controlling manual transmission gears of a transmission can be integrated in the respective covering in a neat and manifest manner.

The drawings show embodiments of the invention which will be explained in detail in the following.

DETAILED DESCRIPTION OF THE INVENTION

Figure 1:
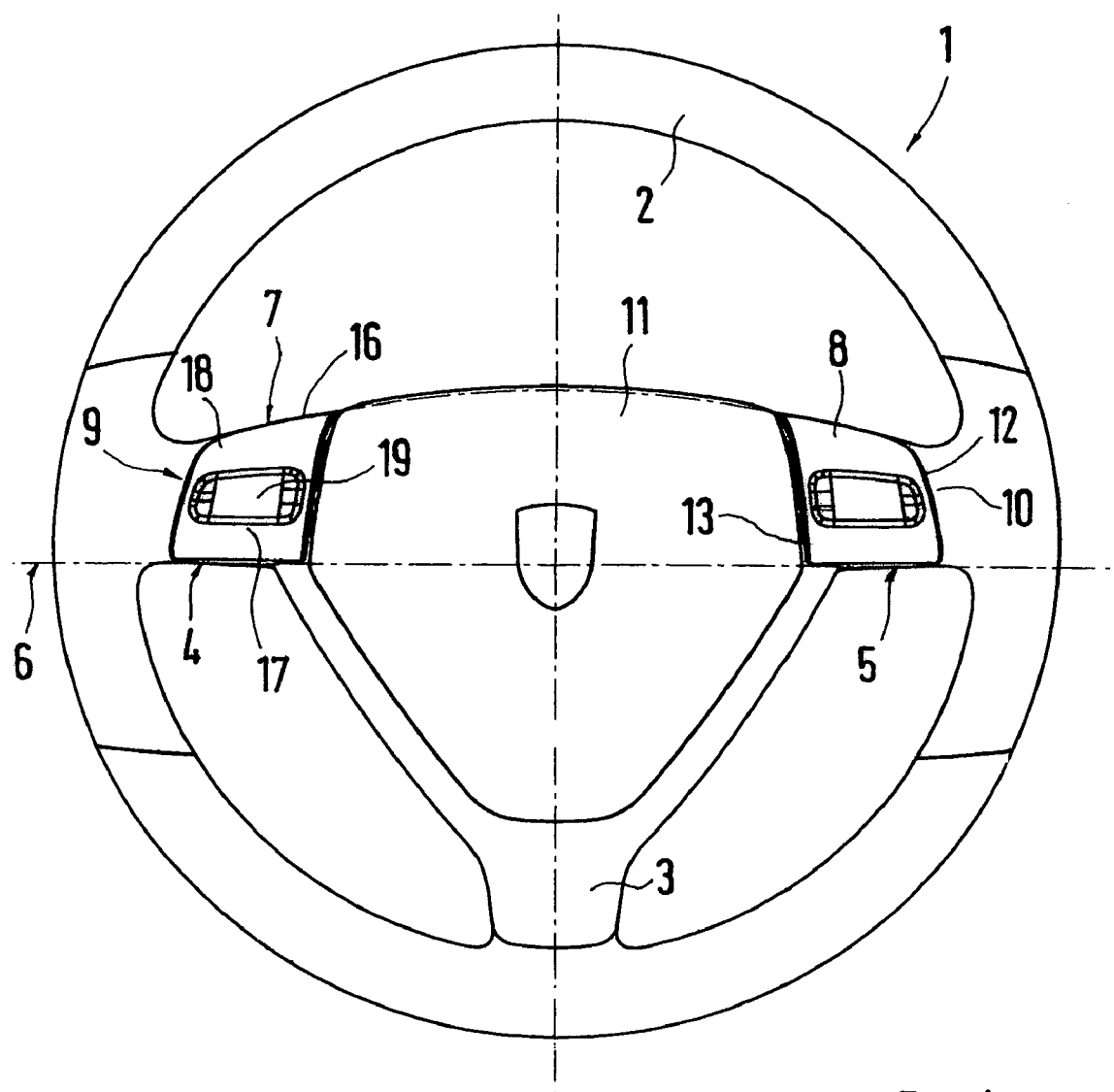
FIG. 1 is top view of a steering wheel for a motor vehicle having a covering according to the invention.

A steering wheel 1 for a motor vehicle, which is not shown in detail, comprises a steering wheel ring 2 provided with an upright spoke 3 and two horizontal spokes 4 and 5. The spokes 4 and 5 surround a horizontal steering wheel plane 6, and the spoke 3 extends below the steering wheel plane 6. First and second coverings 7 and 8 are inserted into the horizontal spokes 4 and 5 adjacent to the steering wheel ring 2. The coverings are mirror-invertedly constructed coverings 7 and 8 which, on first sides, lead away from expansions 9 and 10 of the steering wheel ring 2 and, on second sides, adjoin a central trim plate 11 of the steering wheel 1. Visible joints 12 and 13 are provided between the coverings 7 and 8 and the expansions 9 and 10 or the trim plate 11, which joints 12 and 13 have curved courses, viewed in the upright direction.

Figure 5:
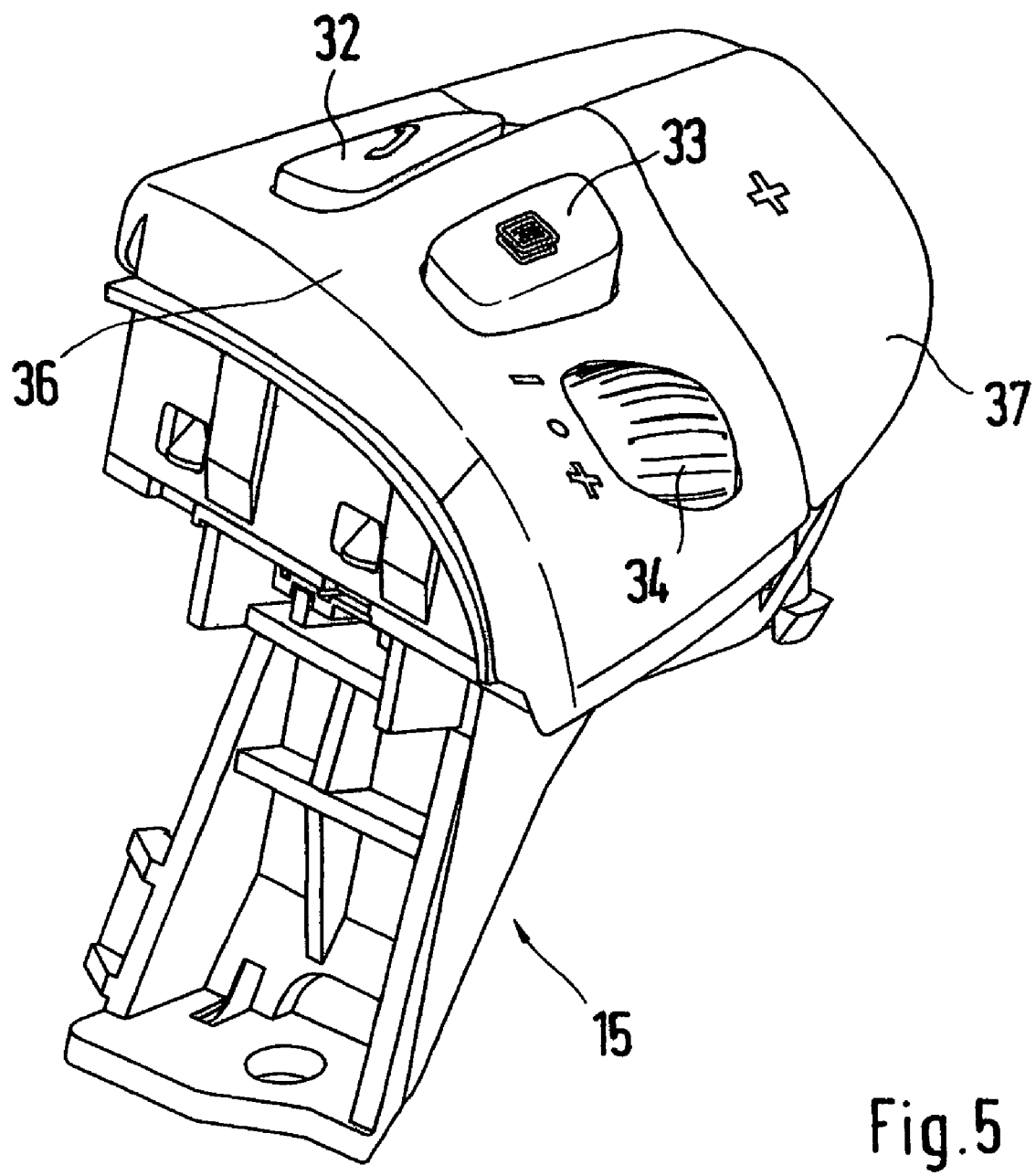
FIG. 5 is perspective view of a covering constructed as a module according to the invention.

Each first covering, such as 7 or 8, is constructed as a module with a fastening console 15—FIG. 5—which carries a cover plate 16. The cover plate 16 of the first covering 7 is provided with an area 17 without switches, and an impression 19, which divides surfaces and has an approximately rectangular basic shape, is integrated in a surface 18 of the cover plate 16.

Figure 2:
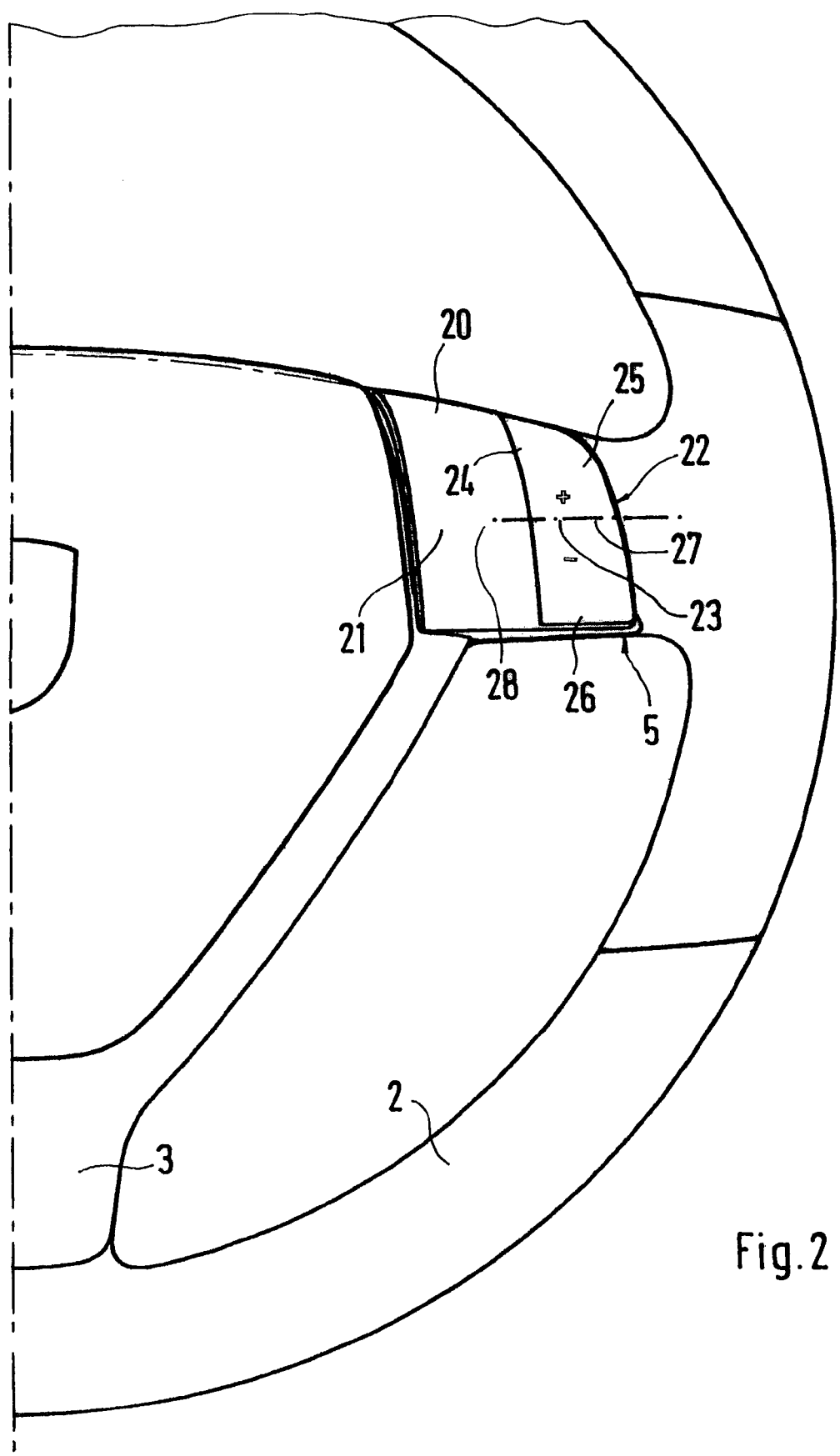
FIG. 2 is an enlarged partial view of FIG. 1 showing a covering according to a first embodiment of the invention.

According to FIG. 2, a second covering 20 is provided with an area 21 without switches 21 and with a function area 23 having a switch 22. The switch 22 is constructed as a transmission switch 24 by means of which manual transmission gears of a transmission of the motor vehicle can be controlled. The transmission switch 24 is constructed as a rocker switch, in which case an actuating plate 26, which comprises a surface 25, of the transmission switch 24 can be swivelled about a horizontal axis 27. Shifting symbols + (plus) and – (minus) are machined into the surface 25 of the actuating plate 26, for the upshifting and downshifting of the transmission gears of the transmission. Furthermore, the surface 25 of the transmission switch 24 is separated from a surface 28 of the area 21 without a switch.

Figure 3:
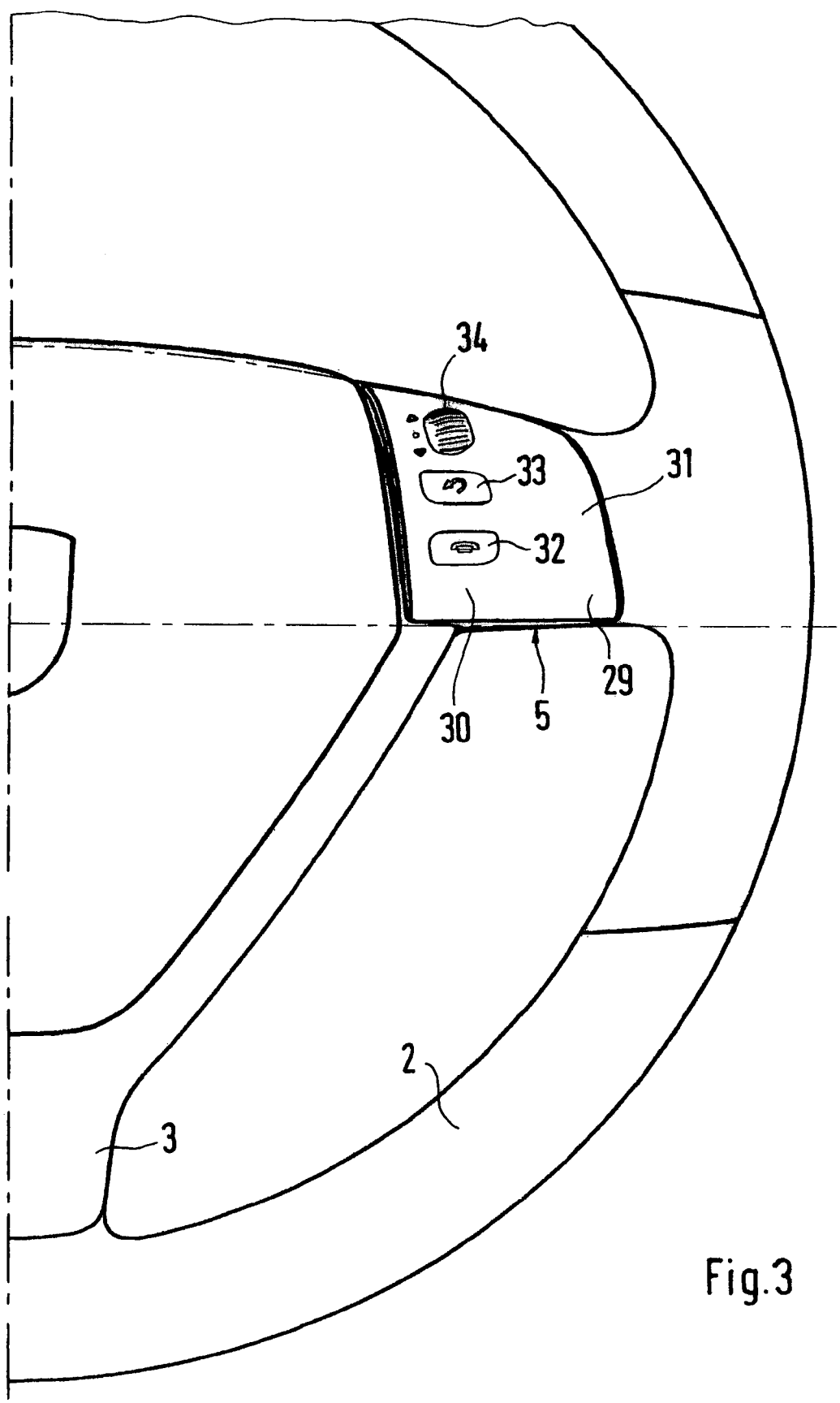
FIG. 3 is a view corresponding to FIG. 2 but of a covering according to a second embodiment of the invention.

FIG. 3 illustrates that a third covering 29 comprises a multifunction switch area 30 and an area 31 without a switch. The multifunction switch area 30 is equipped with several switches 32, 33, and 34 which, viewed in the upright direction, are arranged above one another. The switches 32 and 33 are constructed as pressure switches, whereas the switch 34 is a rotary switch.

Figure 4:
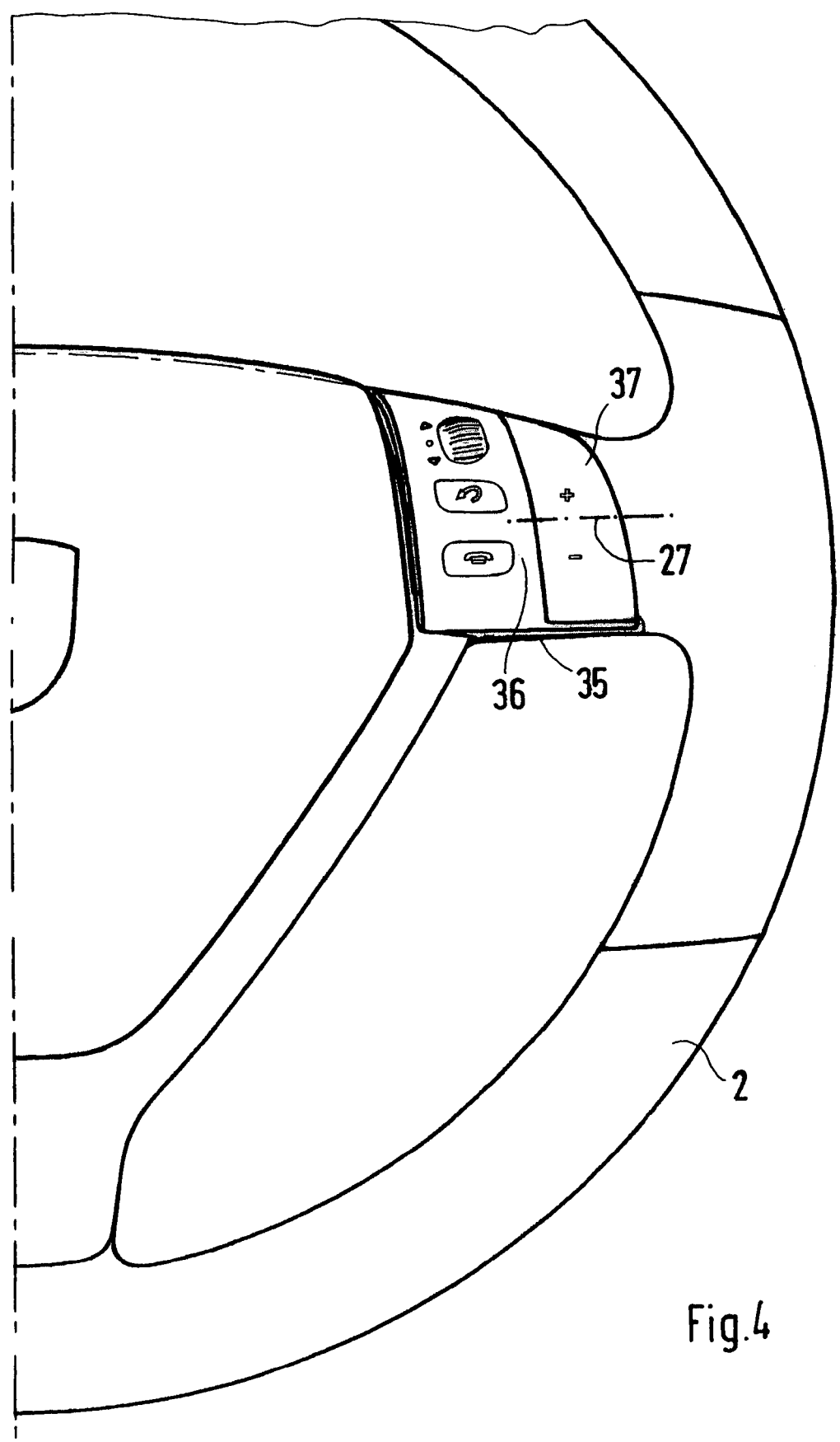
FIG. 4 is a view corresponding to FIG. 3 but of a covering according to a third embodiment of the invention.

FIG. 4 shows a fourth covering 35 with a multifunction switch area 36 and a transmission switch 37. The transmission switch 37 is constructed like the transmission switch 24 of the second covering 20, and the multifunction area 36 is constructed like the multifunction area 30 of the third covering 29.

Finally, the switches 32, 33, and 34 of the multifunction switch area 36 and the transmission switch 24 are arranged and designed in such a manner that they can be operated by the driver of the motor vehicle by means of his thumb. For this purpose, one multifunction switch area 36 and one transmission switch 37 respectively can be provided in a mirror-inverted manner on the spokes 4 and 5 of the steering wheel 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A steering wheel of a motor vehicle comprising:
   at least two approximately horizontally oriented spokes, and a steering wheel ring to which the spokes are connected,
   wherein each of said spokes is designed to accommodate one of (a) a first covering without switches, (b) a second covering including a first area without switches and a second, function area forming part of a switch, (c) a third covering including a first area equipped with several switches and a second area without switches, and (d) a fourth covering including a first area equipped with several switches and a second, function area forming part of a transmission switch by which a transmission of the motor vehicle is controlled, depending on equipment of the motor vehicle.

2. The steering wheel according to claim 1, wherein at least one of the spokes accommodates a covering having an impression worked into a surface thereof so as to divide the surface.

3. The steering wheel according to claim 1, wherein at least one of the spokes accommodates said fourth covering, and wherein the transmission switch is constructed as a rocker switch and can be swiveled about a horizontal axis.

4. The steering wheel according to claim 3, wherein a surface of the second, function area has shifting symbols for indicating upshifting and downshifting.

5. The steering wheel according to claim 4, wherein the surface of the second, function area is separated from a surface of the first area.

6. The steering wheel according to claim 1, wherein the at least one of the spokes accommodates said third covering and the switches are disposed above one another.

7. The steering wheel according to claim 1, wherein at least one of the spokes accommodates said fourth covering and the several switches and the transmission switch are operable by thumbs of a driver of the motor vehicle.

* * * * *